US010110302B2

(12) United States Patent
Mansouri Rad et al.

(10) Patent No.: US 10,110,302 B2
(45) Date of Patent: Oct. 23, 2018

(54) OPTICAL NETWORK MONITORING WITH A PHOTONIC SWITCH

(71) Applicant: Huawei Technologies Co., Ltd., Shenzhen (CN)

(72) Inventors: Mohammad Mehdi Mansouri Rad, Kanata (CA); Eric Bernier, Kanata (CA); Dominic John Goodwill, Ottawa (CA)

(73) Assignee: Huawai Technologies Co., Ltd., Shenzhen (CN)

( * ) Notice: Subject to any disclaimer, the term of this patent is extended or adjusted under 35 U.S.C. 154(b) by 190 days.

(21) Appl. No.: 14/867,665

(22) Filed: Sep. 28, 2015

(65) Prior Publication Data

US 2017/0093486 A1 Mar. 30, 2017

(51) Int. Cl.
*H04B 10/077* (2013.01)
*H04B 10/071* (2013.01)
(Continued)

(52) U.S. Cl.
CPC ..... *H04B 10/0771* (2013.01); *G01M 11/3136* (2013.01); *G01M 11/3145* (2013.01);
(Continued)

(58) Field of Classification Search
CPC ............... H04J 14/0283; H04J 14/0227; H04J 14/0295; H04B 10/032; H04B 10/071;
(Continued)

(56) References Cited

U.S. PATENT DOCUMENTS

| 6,370,294 B1* | 4/2002 | Pfeiffer | H04B 10/075 |
| | | | 385/16 |
| 2005/0031348 A1* | 2/2005 | Choi | H04J 14/0227 |
| | | | 398/59 |

(Continued)

FOREIGN PATENT DOCUMENTS

| CN | 102299746 A | 12/2011 |
| CN | 104734776 A | 6/2015 |

(Continued)

OTHER PUBLICATIONS

Parkin, et al., "Gigabit SFP Transceiver with Integrated Optical Time Domain Reflectometer for Ethernet Access Services," 39th European Conference and Exhibition on Optical Communication (ECOC 2013), Mo. 4.F.3.pdf, http://ieeexplore.ieee.org/stamp/stamp.jsp?arnumber=6647519, Sep. 22-26, 2013, 3 pages.

(Continued)

*Primary Examiner* — Ted Wang
(74) *Attorney, Agent, or Firm* — Conley Rose, P.C.

(57) ABSTRACT

An optical device comprises a transmitter module, a receiver module, and a switch comprising a first port coupled to the transmitter module, a second port coupled to the receiver module, a third port configured to couple to a transmitter fiber, and a fourth port configured to couple to a receiver fiber. A method implemented in a switch, the method comprising operating in a monitor mode that provides for monitoring of a transmitter fiber or a receiver fiber, receiving a command to transition from the monitor mode to a data mode, connecting a transmitter module to the transmitter fiber, and connecting a receiver module to the receiver fiber.

17 Claims, 11 Drawing Sheets

(51) Int. Cl.
*H04Q 11/00* (2006.01)
*G01M 11/00* (2006.01)

(52) U.S. Cl.
CPC ....... *H04B 10/071* (2013.01); *H04B 10/0775* (2013.01); *H04Q 11/0066* (2013.01); *H04Q 2011/0083* (2013.01)

(58) Field of Classification Search
CPC ............ H04B 10/0771; H04B 10/0775; H04Q 2011/0081; H04Q 2011/0083; H04Q 11/0066; G01M 11/3136; G01M 11/3145
See application file for complete search history.

(56) References Cited

U.S. PATENT DOCUMENTS

| | | | |
|---|---|---|---|
| 2007/0237452 A1* | 10/2007 | Truong | H04B 10/2581 385/24 |
| 2012/0147742 A1* | 6/2012 | Kitamori | H04L 43/50 370/225 |
| 2013/0051787 A1* | 2/2013 | Tochio | H04Q 11/0062 398/3 |
| 2014/0077971 A1 | 3/2014 | Archambault et al. | |

FOREIGN PATENT DOCUMENTS

| | | |
|---|---|---|
| EP | 1241805 A2 | 9/2002 |
| EP | 2002572 A2 | 12/2008 |
| WO | 2007109277 A2 | 9/2007 |

OTHER PUBLICATIONS

Zuffada, "Low Cost Silicon Photonics Technology Platform: Plans, Perspectives and Roadmap," 39th European Conference and Exhibition on Optical Communication (ECOCC 2013)—Workshop on PICs, London, Sep. 22, 2103, 16 pages.
Rad, et al., "Passive Optical Network Monitoring: Challenges and Requirements," Advances in Passive Optical Networks, IEEE Communications Magazine, Feb. 2011, pp. S45-S52.
Partial English Translation and Abstract of Chinese Patent Application No. CN102299746, Dec. 28, 2011, 8 pages.
Partial English Translation and Abstract of Chinese Patent Application No. CN104734776, Jun. 24, 2015, 7 pages.
Foreign Communication From A Counterpart Application, PCT Application No. PCT/CN2016/097374, International Search Report dated Dec. 1, 2016, 4 pages.
Foreign Communication From a Counterpart Application, European Application No. 16850231.8, Partial Supplementary European Search Report dated Aug. 1, 2018, 13 pages.

\* cited by examiner

OPTICAL NETWORK MONITORING WITH A PHOTONIC SWITCH

BACKGROUND

Optical performance monitoring (OPM) is important in future agile optical networks (AONs), in which any fiber problem may cause significant downtime and operating cost for the network infrastructure. OPM should be available for each individual device that connects to an optical fiber. Without OPM, locating faulty optical fibers would be difficult, particularly when fiber density and system complexity are high. An optical time-domain reflectometer (OTDR) is a device used for monitoring optical fibers as part of OPM. However, the typical external hand-held OTDR is bulky, energy-consuming, and expensive.

SUMMARY

In one embodiment, the disclosure includes an optical device comprising a transmitter module, a receiver module, and a switch comprising a first port coupled to the transmitter module, a second port coupled to the receiver module, a third port configured to couple to a transmitter fiber, and a fourth port configured to couple to a receiver fiber.

In another embodiment, the disclosure includes an optical device comprising a transmitter module configured to transmit optical data signals in a data mode, and transmit optical test pulses in a monitor mode, a receiver module configured to receive input optical data signals in the data mode, and receive reflected optical test pulses in the monitor mode, and a switch coupled to the transmitter module and the receiver module and configured to switch optical paths to implement the data mode or the monitor mode.

In yet another embodiment, the disclosure includes a method implemented in a switch, the method comprising operating in a monitor mode that provides for monitoring of a transmitter fiber or a receiver fiber, receiving a command to transition from the monitor mode to a data mode, connecting a transmitter module to the transmitter fiber, and connecting a receiver module to the receiver fiber.

In yet another embodiment, the disclosure includes a method implemented in a switch, the method comprising operating in a data mode that provides for communication of user data through the switch, receiving a request to transition from the data mode to a monitor mode that provides for monitoring of a transmitter fiber or a receiver fiber, both the transmitter fiber and the receiver fiber are coupled to the switch, and connecting ports of the switch to implement the monitor mode.

In yet another embodiment, the disclosure includes a method comprising transmitting, by a transmitter module, an optical test pulse to a switch, switching, by the switch, the optical test pulse to a fiber to be tested, receiving, by the switch, a reflected optical test pulse that is a reflected portion of the optical test pulse, and switching, by the switch, the reflected optical test pulse to a receiver module for monitoring.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalent.

Figure 1:
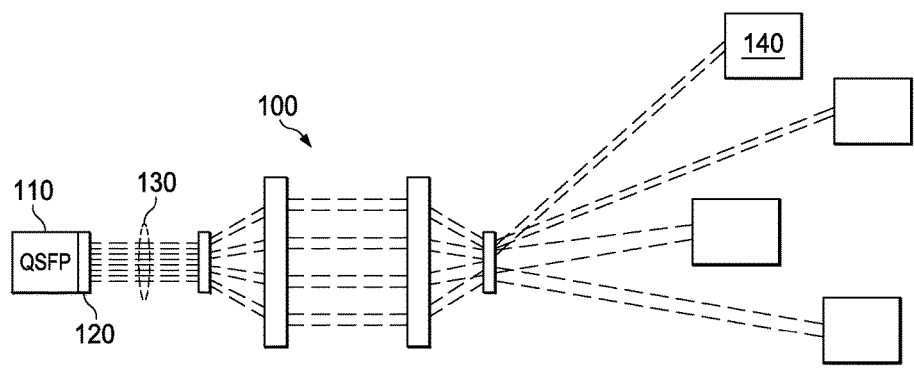
FIG. 1 is a schematic diagram of an optical network.

FIG. 1 is a schematic diagram of an optical network 100. The optical network 100 includes a quad small form-factor pluggable (QSFP) transceiver 110, five patch panels 120, 40 optical fibers 130, and four destination units 140. The components of the optical network 100 may be arranged as shown or in any other suitable manner.

The QSFP transceiver 110 is a transceiver that includes four transmitters and four receivers for data communication. The patch panels 120 couple the QSFP transceiver 110 to the optical fibers 130 and connect different optical fibers 130 to each other. The optical fibers 130 are used to communicate optical signals between the QSFP transceiver 110 and the destination units 140. The destination units 140 are any units that can receive and transmit optical signals. For example, the destination units are data centers. Optical fibers 130 may become faulty when they have cuts, bends, debris, or other issues. It can be difficult to identify which of multiple optical fibers 130 in the optical network 100 is faulty, and to determine the location of the fault.

Figure 2:
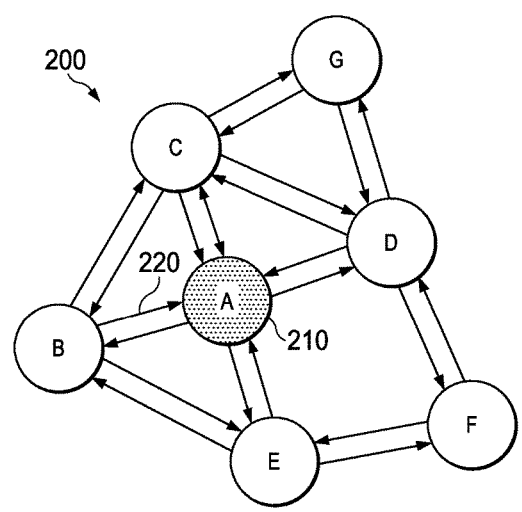
FIG. 2 is a schematic diagram of a data center.

FIG. 2 is a schematic diagram of a data center 200. The data center 200 includes seven nodes 210 and 22 optical fibers 220. The components of the data center 200 may be arranged as shown or in any other suitable manner.

Each node 210 transmits and receives optical signals using a transmitter and a receiver (not shown in FIG. 2). The optical fibers 220 communicate optical signals between any two adjacent nodes 210. It can be difficult to identify which of multiple optical fibers 220 in the data center 200 is faulty, and to determine the location of the fault. Therefore, a need exists for an optical device that monitors the optical fibers 130, 220 and makes such a determination.

Figure 3:
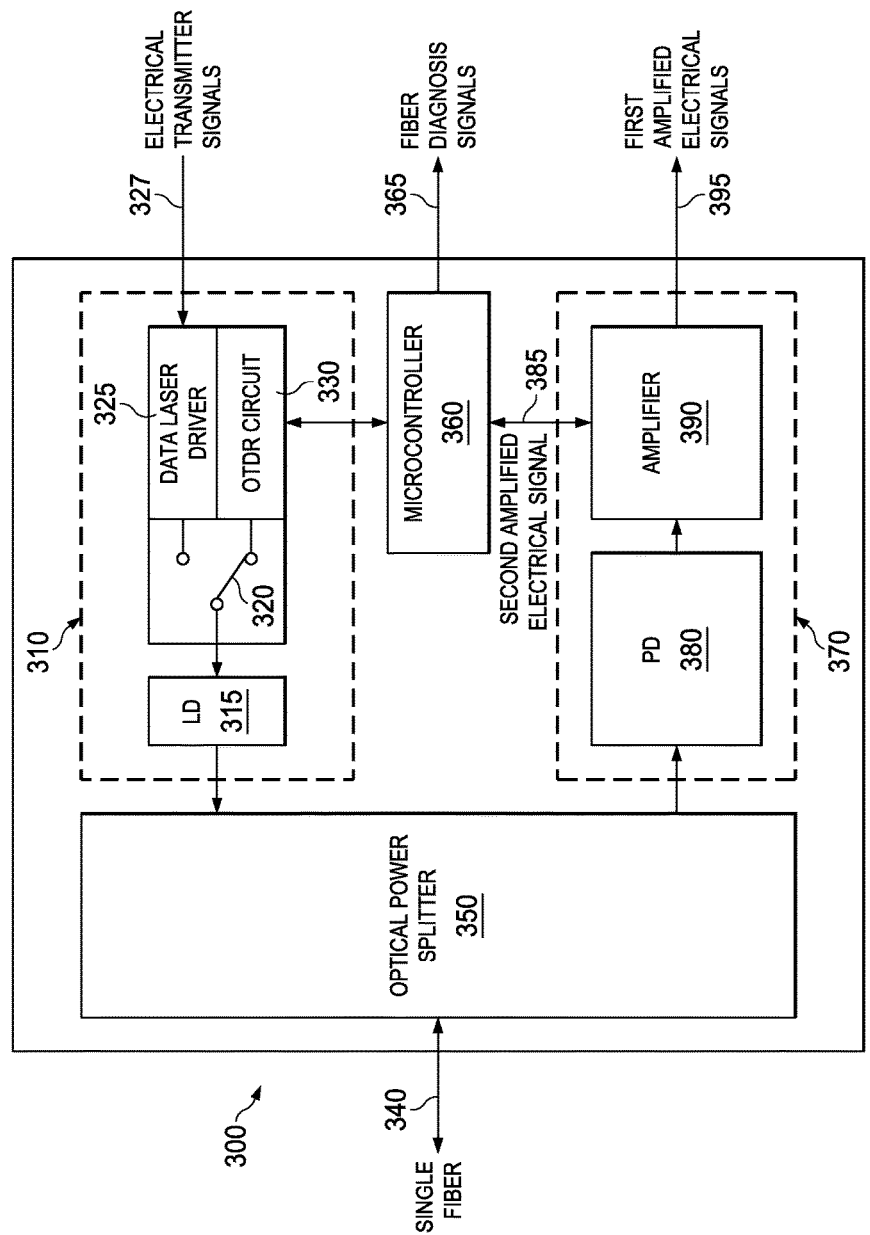
FIG. 3 is a schematic diagram of an optical device.

FIG. 3 is a schematic diagram of an optical device 300. The optical device 300 is described in Neil Parkin, et al., "Gigabit SFP Transceiver with Integrated Optical Time Domain Reflectometer for Ethernet Access Services," 39th European Conference and Exhibition on Optical Communication (ECOC 2013), September 2013, which is incorporated by reference. The optical device 300 includes a transmitter module 310, an optical fiber 340, an optical power splitter 350, a microcontroller 360, and a receiver module 370. The optical device 300 may operate as a transceiver or a fiber monitor. Generally, the transmitter module 310 transmits optical signals down the optical fiber 340 via the optical power splitter 350, and the receiver module 370 receives optical signals from the optical fiber 340 via the optical power splitter 350. The transmitted and received signals could be ordinarily transmitted and received signals, or the received signal could be a reflection of a test signal transmitted by the transmitter module 310. The components of the optical device 300 may be arranged as shown or in any other suitable manner.

The transmitter module 310 includes a data laser driver 325, an OTDR circuit 330, a mode switch 320, and a laser diode (LD) 315. The data laser driver 325 receives electrical transmitter signals 327, amplifies the electrical transmitter signals 327, and outputs amplified electrical transmitter signals. The OTDR circuit 330 generates electrical control signals that drive the LD 315 to generate optical test pulses for fiber monitoring. The mode switch 320 couples the data laser driver 325 to the LD 315 when the optical device 300 is configured as a transceiver. The mode switch 320 couples the OTDR circuit 330 to the LD 315 when the optical device 300 is configured as a fiber monitor. The LD 315 generates optical data signals modulated by the amplified electrical transmitter signals when the optical device 300 is configured as a transceiver. The LD 315 generates optical test pulses when the optical device 300 is configured as a fiber monitor.

The optical fiber 340 communicates optical data signals or optical test pulses between the optical device 300 and other devices (not shown). The optical power splitter 350 splits received optical signals from the optical fiber 340 and passes a portion of the received optical signals to a photodiode (PD) 380. The remaining portion of the received optical signals is lost. The optical power splitter 350 passes transmitted optical signals such as the optical data signals or the optical test pulses from the LD 315 to the optical fiber 340. The optical power splitter 350 may instead be an optical circulator or a directional coupler. The microcontroller 360 communicates with the transmitter module 310 and the receiver module 370. The microcontroller 360 generates fiber diagnosis signals 365 when the optical device 300 is configured as a fiber monitor.

The receiver module 370 includes the PD 380 and an amplifier 390. The PD 380 receives the portion of the received optical signals described above and converts the portion of the received optical signals to electrical signals. The amplifier 390 receives the electrical signals and amplifies the electrical signals. When the optical device 300 is configured as a transceiver, the amplifier outputs transceiving amplified electrical signals 395. When the optical device 300 is configured as a fiber monitor, the amplifier 390 outputs monitoring amplified electrical signals 385 to the microcontroller for fiber diagnosis.

In operation, when the microcontroller 360 sends a request to the transmitter module 310 and the receiver module 370 to configure the optical device 300 as a transceiver, the mode switch 320 couples the data laser driver 325 to the LD 315. In the transmitter module 310, the data laser driver 325 receives the electrical transmitter signals 327, amplifies the electrical transmitter signals 327, and outputs the amplified electrical transmitter signals. The LD 315 receives the amplified electrical transmitter signals and generates the optical data signals modulated by the amplified electrical transmitter signals. The optical power splitter 350 passes the optical signals to the optical fiber 340. The optical power splitter 350 passes external input optical signals to the receiver module 370 via the optical fiber 340. In the receiver module 370, the PD 380 receives the external input optical signals and converts them to transceiving electrical signals. The amplifier 390 receives the transceiving electrical signals, amplifies the transceiving electrical signals, and outputs transceiving amplified electrical signals 395.

When the microcontroller 360 instructs the transmitter module 310 and the receiver module 370 to configure the optical device 300 as a fiber monitor, the mode switch 320 couples the OTDR circuit 330 to the LD 315. In the transmitter module 310, the OTDR circuit 330 generates electrical control signals. The LD 315 receives the electrical control signals and generates optical test pulses. The optical power splitter 350 passes the optical test pulses to the optical fiber 340. When the optical fiber 340 is faulty, the optical test pulses are reflected by the defect in the optical fiber 340 and travel back toward the optical power splitter 350. Otherwise, the optical test pulses reflect at the end of the optical fiber 340. This reflection is known as backscattering. The optical power splitter 350 splits the reflected optical test pulses and passes a portion of the reflected optical test pulses to the receiver module 370. In the receiver module 370, the PD 380 receives the portion of the reflected optical test pulses and converts them to second electrical signals. The amplifier 390 receives the second electrical signals, amplifies the second electrical signals, and outputs second amplified electrical signals 385 to the microcontroller 360.

The microcontroller 360 determines whether the optical fiber 340 is functioning properly by calculating the reflection location where the optical test pulses reflect in the optical fiber 340. Specifically, the microcontroller 360 calculates the reflection location based on the velocity of light in the optical fiber 340, the distance between the LD 315 and the optical power splitter 350, and the distance between the PD 380 and the optical power splitter 350, which are known. The microcontroller 360 calculates the reflection location based on the time it takes for the optical test pulses to travel from the LD 315, to the reflection location, and back to the PD 380. The travel time depends on the distance of the reflection location from the optical power splitter 350. When the reflection location is at the end of the optical fiber 340, the fiber diagnosis signal 365 indicates the optical fiber 340 is not faulty. When the reflection location is not at the end of the optical fiber 340, the fiber diagnosis signal 365 indicates the optical fiber 340 is faulty and indicates the location of the fault.

The optical device 300 has several drawbacks. Firstly, the optical device 300 has a single optical fiber 340. The single optical fiber 340 is incompatible with a standard duplex lucent connection (LC) pair, which includes two fiber ports. Secondly, the optical power splitter 350 introduces significant power loss, which makes the optical device 300 energy inefficient. Thirdly, the mode switch 320 and the OTDR circuit 330 increase the size and cost of the optical device 300.

Disclosed herein are embodiments of an improved optical device that can be configured as either a transceiver or a fiber monitor. The optical device includes a switch. In one embodiment, the switch is a silicon photonic switch, which adds negligible cost for fabrication using silicon photonic technologies. The switch may replace an optical power splitter and thus reduce power loss. The switch includes two inputs and two outputs and may employ a Mach-Zehnder interferometer (MZI) structure. Additionally, the optical device is coupled to a transmitter fiber and a receiver fiber, which make the optical device compatible with a standard duplex LC pair. The disclosed embodiments may be employed in data centers, interposer systems, metro networks, long-haul networks, and other systems and networks employing optoelectronic transceivers.

Figure 4:
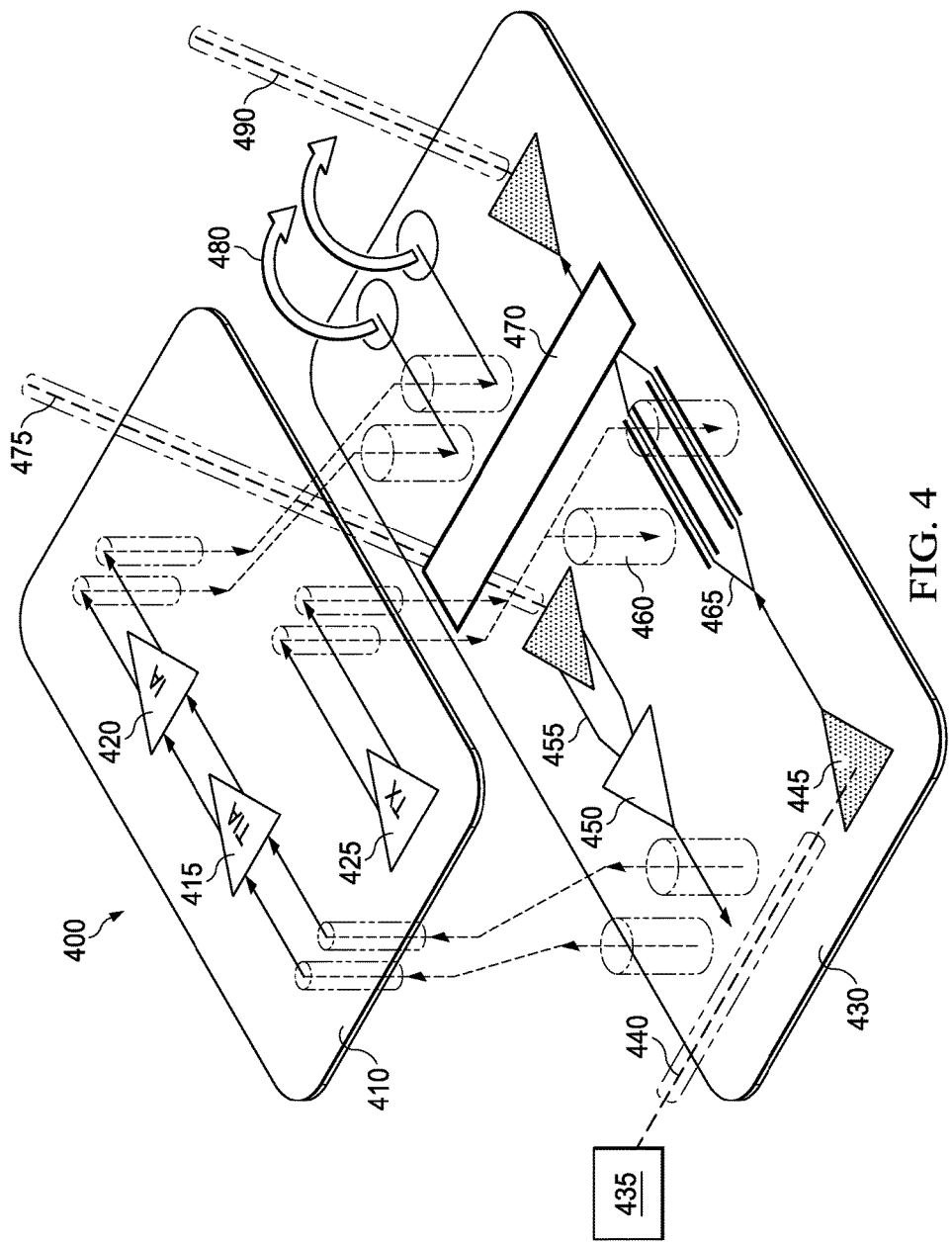
FIG. 4 is a perspective view of an interposer system.

FIG. 4 is a perspective view of an interposer system 400. The interposer system 400 is an optoelectronic integrated circuit configured to perform a variety of functions such as receiving optical signals, amplifying optical signals, and transmitting optical signals. The interposer system 400 includes an electrical chip 410 and a photonic chip 430 coupled via copper pillars 460. The components of the interposer system 400 may be arranged as shown or in any other suitable manner.

The electrical chip 410 is configured to provide electrical control of the photonic chip 430, signal modulation, and other functions. The electrical chip 410 includes a transimpedance amplifier (TIA) 415, a linear amplifier (LA) 420, and an electrical transmitter (TX) 425. The photonic chip 430 includes a first fiber 440 coupled to an external continuous-wave laser 435, grating coupler 445, a Mach-Zehnder modulator (MZM) 465, a second fiber 475, wires 480, a third fiber 490, an optical monitoring device 470, an optical waveguide 455, and a PD 450.

The optical monitoring device 470 is coupled to the second fiber 475 and is configured to monitor the second fiber 475. The optical monitoring device 470 may also monitor the first fiber 440 and the third fiber 490. The optical monitoring device 470 is similar to the optical device 500 described below.

Figure 5:
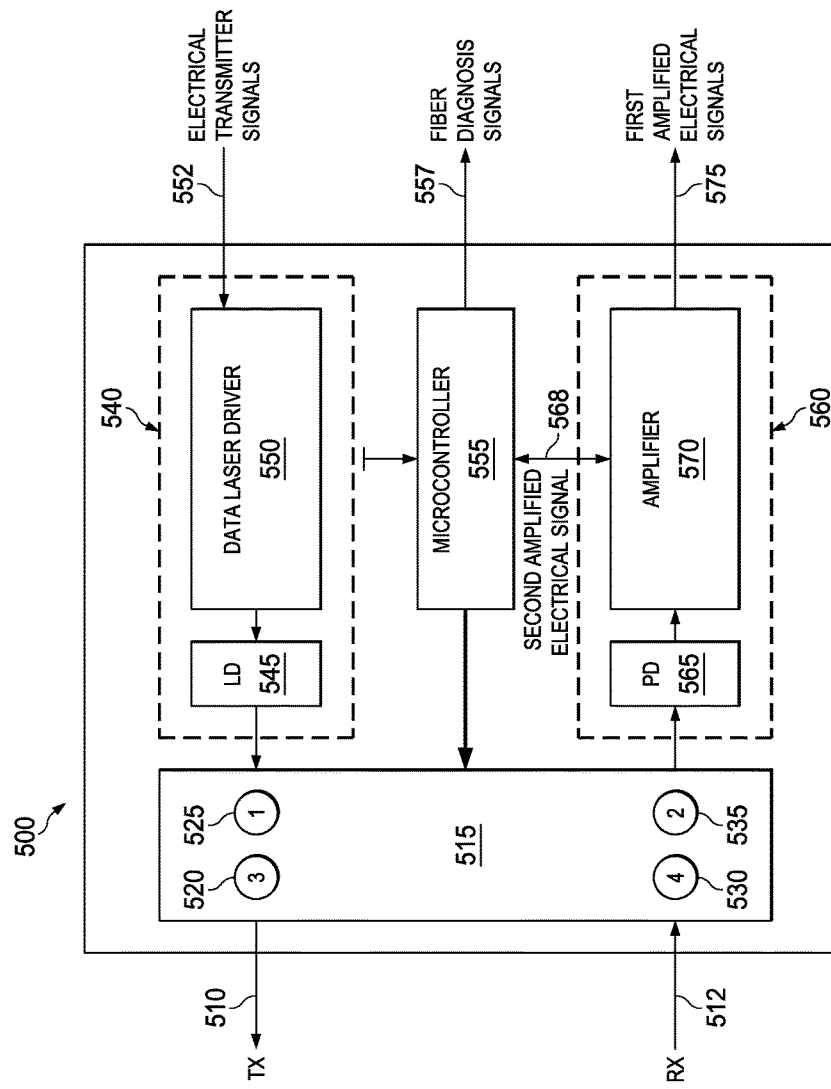
FIG. 5 is a schematic diagram of an optical device.

FIG. 5 is a schematic diagram of an optical device 500. The optical device 500 includes a switch 515, a transmitter module 540, a receiver module 560, and a microcontroller 555. The optical device 500 operates in a data mode or one of two monitor modes. In the data mode, the optical device 500 is configured as a transceiver that transmits and receives optical signals. In a first monitor mode, the optical device 500 is configured as a fiber monitor that monitors a transmitter fiber 510. In a second monitor mode, the optical device 500 is configured as a fiber monitor that monitors a receiver fiber 512. Unlike the optical device 300, the optical device 500 does not include the mode switch 320, but instead includes the switch 515. Additionally, unlike the optical device 300, which includes a single optical fiber 340, the optical device 500 includes the transmitter fiber 510 and the receiver fiber 512. The components of the optical device 500 may be arranged as shown or in any other suitable manner.

The switch 515 is configured to switch optical paths and includes a first port 525, a second port 535, a third port 520, and a fourth port 530. The switch 515 may be implemented with different structures due to different requirements of insertion loss and configuration time. Insertion loss of the switch 515 is defined as the loss of signal power resulting from the insertion of the switch 515 into the optical device 500. Configuration time of the switch 515 is defined as the time it takes for the switch 515 to switch between modes, which are described with respect to FIGS. 7-10 below. The switch 515 may be a silicon photonic switch and may have the structure in FIG. 6.

The transmitter module 540 is coupled to the first port 525 and includes a data laser driver 550 and an LD 545. The data laser driver 550 is configured to amplify a received electrical transmitter signal 552, and output amplified electrical transmitter signals. The amplified electrical transmitter signals drive the LD 545 to generate an optical output signal, which is sent to the first port 525 of the switch 515.

The receiver module 560 is coupled to the second port 535 and includes a PD 565 and an amplifier 570. The PD 565 is configured to convert received optical signals to electrical signals. The amplifier 570 amplifies the received electrical signals. In the data mode, the amplifier 570 outputs the amplified electrical signals 575 for further processing by the optical device 500 or another device (not shown). In the monitor mode, the amplifier outputs the amplified electrical signals 568 to the microcontroller 555.

The transmitter fiber 510 is coupled to the third port 520. The third port 520 is referred to as a transmitter port. The third port 520 is configured to communicate the optical data signals in the data mode and the optical test pulses in the monitor mode from the transmitter module 540. The receiver fiber 512 is coupled to the fourth port 530. The fourth port 530 is referred to as a receiver port. The fourth port 530 is configured to communicate the input optical data signals in the data mode from external devices (not shown) and the optical test pulses in the monitor modes from the transmitter module 540.

The microcontroller 555 is coupled to the transmitter module 540, the switch 515, and the receiver module 560 and is configured to instruct the transmitter module 540, the switch 515, and the receiver module 560 to operate in the data mode or one of the monitor modes. In the monitor modes, the microcontroller 555 is also configured to generate fiber diagnosis signals 557 indicating if the transmitter fiber 510 or the receiver fiber 512 is faulty. Operation of the optical device 500 is described further below.

Figure 6:
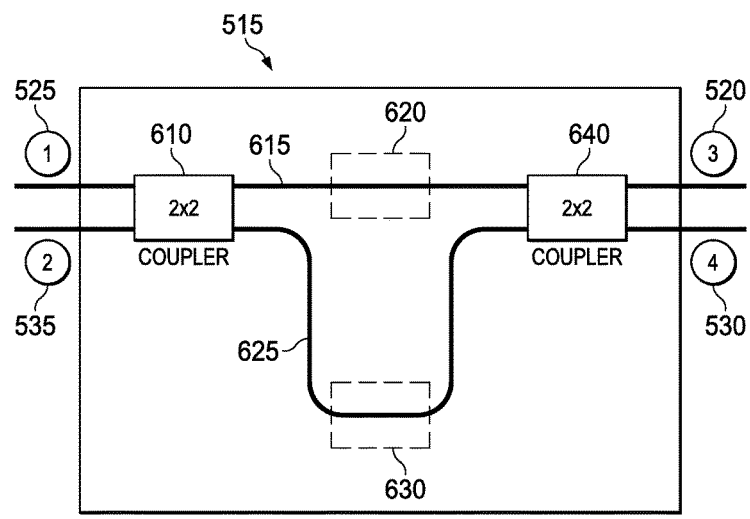
FIG. 6 is a schematic diagram of the switch in FIG. 5.

FIG. 6 is a schematic diagram of the switch 515 in FIG. 5. While FIG. 6 shows one architecture for the switch 515, other suitable architectures may be used. The switch 515 has a 2×2 MZI structure. The switch 515 includes the first port 525, the second port 535, a first 2×2 coupler 610, a first arm waveguide 615, a second arm waveguide 625, a first phase shifter 620, a second phase shifter 630, a second 2×2 coupler 640, the third port 520, and the fourth port 530. The components of the switch 515 may be arranged as shown or in any other suitable manner.

The first phase shifter 620 is configured to change the phases of optical signals that travel in the first arm waveguide 615. The second phase shifter 630 is configured to change the phases of optical signals that travel in the second arm waveguide 625. By tuning the first phase shifter 620 and the second phase shifter 630, the connections between the first port 525 and the second port 535 on the one side and the third port 520 and the fourth port 530 on the other side may be configured differently as described with respect to FIGS. 7-8 below.

There are two main methods of tuning the first phase shifter 620 and the second phase shifter 630. In one method, the thermal-optic effect is used by applying electrical voltages with a direct current (DC) source (not shown) to the first phase shifter 620, the second phase shifter 630, or both to increase the temperature and induce changes of the refractive index of the first phase shifter 620, the second phase shifter 630, or both. In the other method, the free carrier plasma effect is used by injecting free carriers in the first phase shifter 620, the second phase shifter 630, or both to change carrier concentration and induce change of the refractive index of the first phase shifter 620, the second phase shifter 630, or both. The method using the free carrier plasma effect provides faster configuration speed than the method using the thermal-optic effect. For example, when the switch 515 is a silicon photonic switch, a typical configuration time based on the method using the free carrier plasma effect is approximately 1 nanosecond (ns), while a typical configuration time based on the method using the thermo-optic effect is approximately 1 microsecond (μs). While two methods of tuning the first phase shifter 620 and the second phase shifter 630 are described, other suitable methods may also be used.

Figure 7:
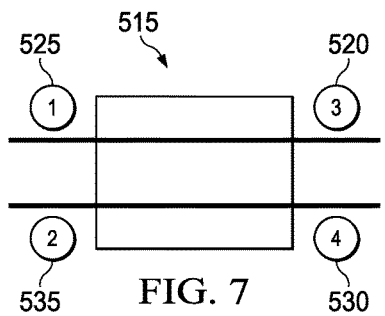
FIG. 7 is a schematic diagram of a first port connection configuration for the switch in FIG. 5.

FIG. 7 is a schematic diagram of a first port connection configuration for the switch 515 in FIG. 5. The first port connection configuration is implemented by tuning the first phase shifter 620, the second phase shifter 630, or both. As shown, the first port 525 is connected to the third port 520, and the second port 535 is connected to the fourth port 530.

Figure 8:
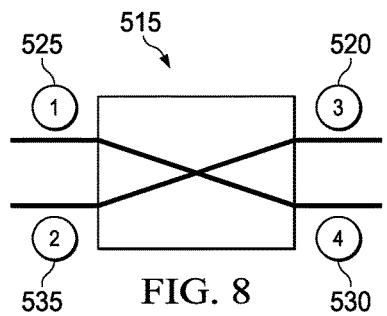
FIG. 8 is a schematic diagram of a second port connection configuration for the switch in FIG. 5.

FIG. 8 is a schematic diagram of a second port connection configuration for the switch 515 in FIG. 5. The second port connection configuration is implemented by tuning the first phase shifter 620, the second phase shifter 630, or both. As shown, the first port 525 is connected to the fourth port 530, and the second port 535 is connected to the third port 520.

Figure 9:
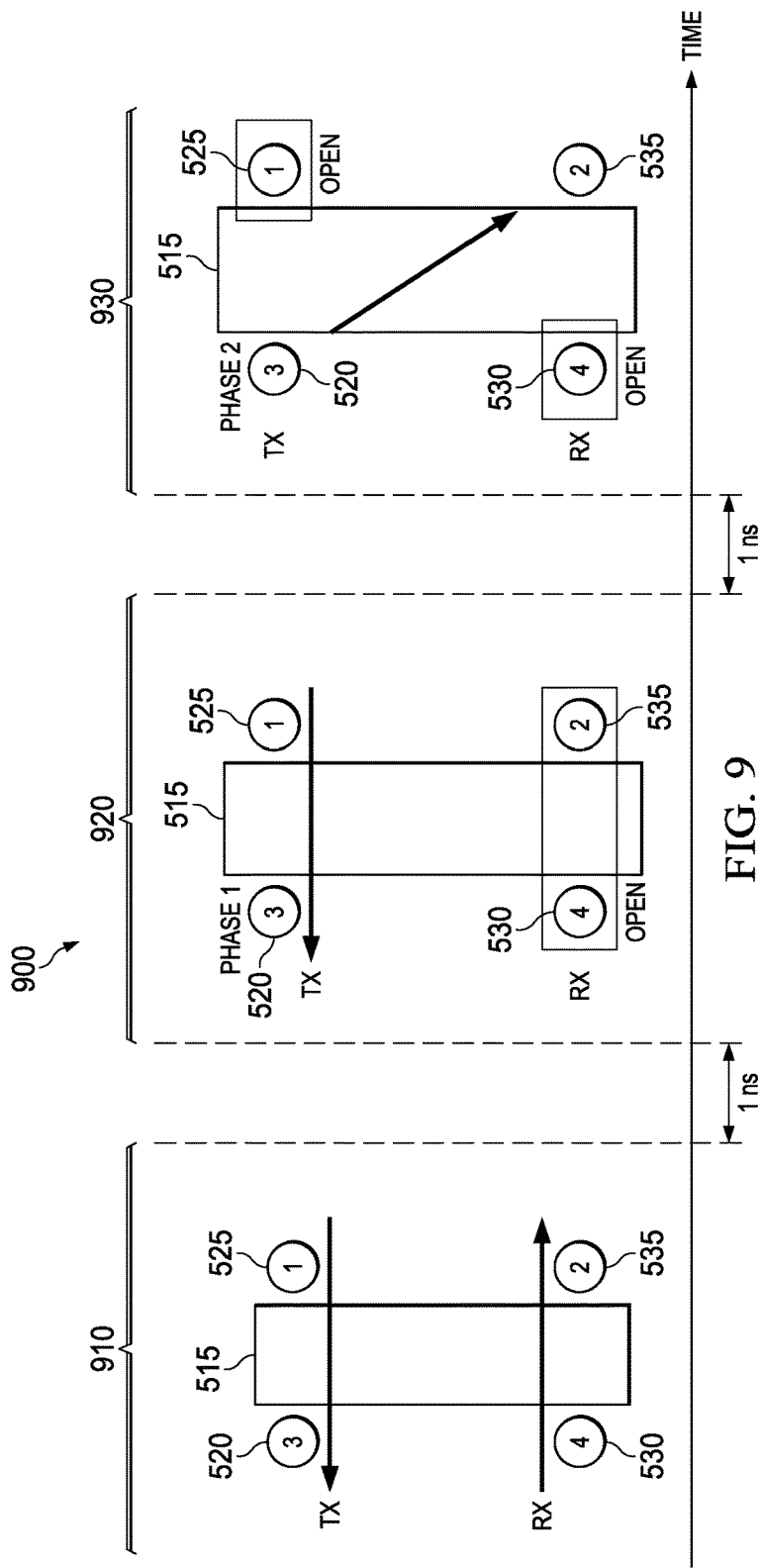
FIG. 9 is a diagram of the switch in FIG. 5 transitioning from the data mode to the first monitor mode.

FIG. 9 is a diagram 900 of the switch 515 in FIG. 5 transitioning from the data mode to the first monitor mode. In the first monitor mode, the transmitter fiber 510 is monitored. A timeline shows the time required to perform the transition.

In a first stage 910, the switch 515 is in the data mode. Specifically, the first port 525 is connected to the third port 520, and the second port 535 is connected to the fourth port 530. Although not shown, the first port 525 is coupled to the transmitter module 540, the second port 535 is coupled to the receiver module 560, the third port 520 is coupled to the transmitter fiber 510, and the fourth port 530 is coupled to the receiver fiber 512.

In a second stage 920, the switch 515 is in a first step of the first monitor mode. The switch 515 transitions from the first stage 910 to the second stage 920 after receiving from the microcontroller 555 a request to transition from the data mode to the first monitor mode. In the second stage 920, the second port 535 disconnects from the fourth port 530, and the first port 525 connects to the third port 520. Optical test pulses travel from the transmitter module 540, through the first port 525 and the third port 520, and to the transmitter fiber 510. As shown, the switch 515 may take about 1 ns of configuration time to transition from the first stage 910 to the second stage 920.

In a third stage 930, the switch 515 is in a second step of the first monitor mode. The switch 515 transitions from the second stage 920 to the third stage 930 after the optical test pulses from the transmitter module 540 enter the transmitter fiber 510. In the third stage 930, the first port 525 disconnects from the third port 520, and the second port 535 connects to the third port 520. As shown, the switch 515 may take about 1 ns of configuration time to transition from the second stage 920 to the third stage 930.

Figure 10:
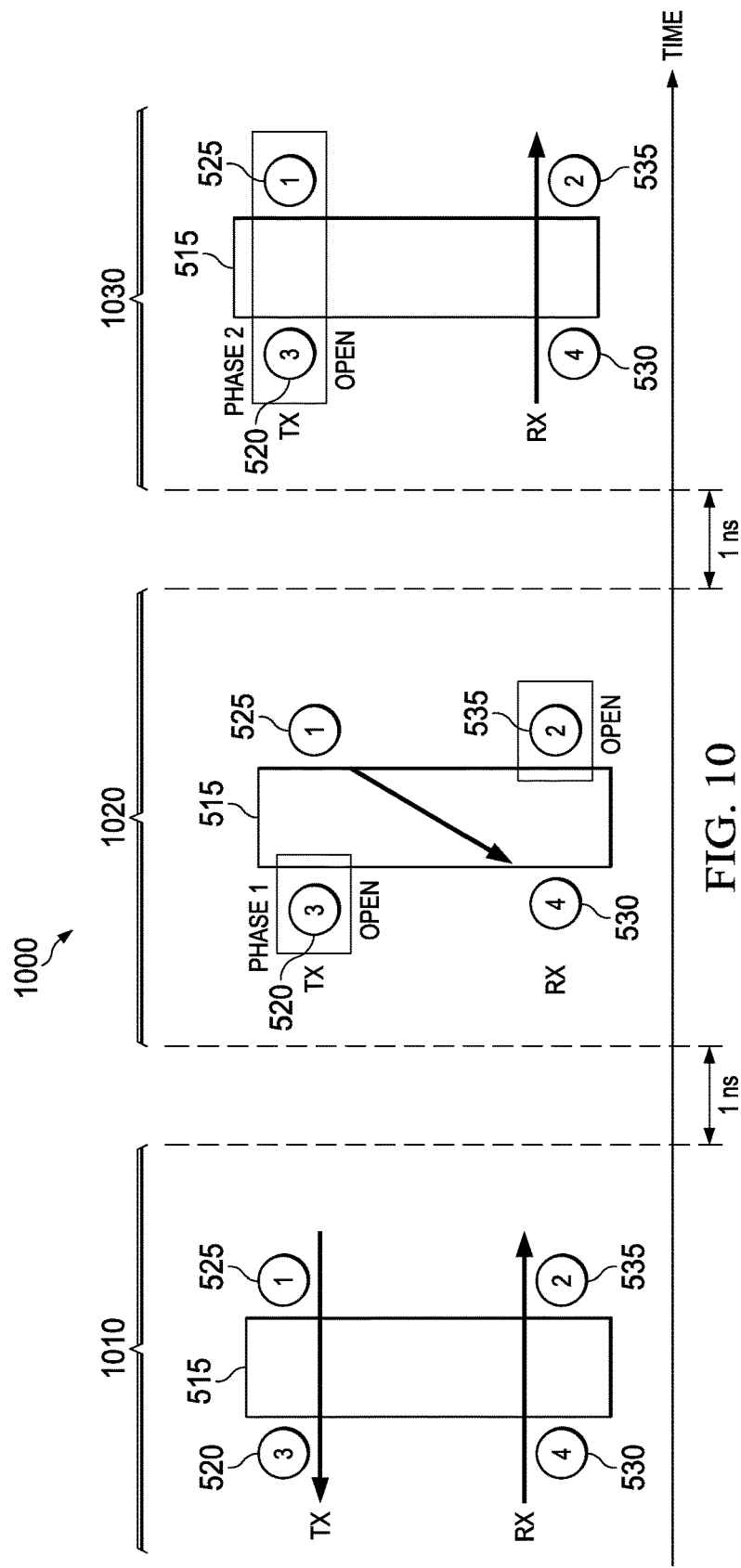
FIG. 10 is a diagram of the switch in FIG. 5 transitioning from the data mode to the second monitor mode.

FIG. 10 is a diagram 1000 of the switch 515 in FIG. 5 transitioning from the data mode to the second monitor mode. In the second monitor mode, the receiver fiber 512 is monitored. A timeline shows the time required to perform the transition.

In a first stage 1010, the switch 515 is in the data mode. Specifically, the first port 525 is connected to the third port 520, and the second port 535 is connected to the fourth port 530. Although not shown, the first port 525 is coupled to the transmitter module 540, the second port 535 is coupled to the receiver module 560, the third port 520 is coupled to the transmitter fiber 510, and the fourth port 530 is coupled to the receiver fiber 512.

In a second stage 1020, the switch 515 is in a second step of the second monitor mode. The switch 515 transitions from the first stage 1010 to the second stage 1020 after receiving from the microcontroller 555 a request to transition from the data mode to the second monitor mode. In the second stage 1020, the second port 535 disconnects from the fourth port 530 and the first port 525 connects to the fourth port 530. Optical test pulses travel from the transmitter module 540, through the first port 525 and the fourth port 530, and to the receiver fiber 512. As shown, the switch 515 may take about 1 ns of configuration time to transition from the first stage 1010 to the second stage 1020.

In a third stage 1030, the switch 515 is in a second step of the second monitor mode. The switch 515 transitions from the second stage 920 to the third stage 930 after the optical test pulses from the transmitter module 540 enter the receiver fiber 512. In the third stage 1030, the first port 525 disconnects from the fourth port 530, and the second port 535 connects to the fourth port 530. As shown, the switch 515 may take about 1 ns of configuration time to transition from the second stage 1020 to the third stage 1030.

Returning to FIG. 5, in operation, the microcontroller 555 sends a request to the switch 515, the transmitter module 540, and the receiver module 560 to operate in the data mode or one of the monitor modes. In the data mode, electrical transmitter signals 552 carrying transmission data are input to the data laser driver 550, which amplifies the electrical transmitter signals 552, and outputs the amplified electrical transmitter signals. The LD 545 receives the amplified electrical transmitter signals and generates the optical data signals modulated by the amplified electrical transmitter signals.

The switch 515 configures port connections so that the first port 525 is connected to the third port 520 and the second port 535 is connected to the fourth port 530. Thus, the transmitter module 540 couples to the transmitter fiber 510, and the receiver module 560 couples to the receiver fiber 512. The switch 515 receives the optical data signals from the LD 545 and switches the optical data signals to the transmitter fiber 510.

The switch 515 also receives input optical data signals from the external devices (not shown) via the receiver fiber 512 and switches the input optical data signals from the receiver fiber 512 to the receiver module 560. In the receiver module 560, the PD 565 converts the input optical data signals to first electrical signals. The amplifier 570 receives the first electrical signals, amplifies the first electrical signals, and outputs the first amplified electrical signals 575.

In the monitor modes, electrical transmitter signals 552 carrying control signals are input into the data laser driver 550, which amplifies the electrical transmitter signals 552, and outputs the amplified electrical transmitter signals. The LD 545 receives the amplified electrical transmitter signals and generates optical test pulses.

In the first monitor mode, the optical test pulses travel in the transmitter fiber 510, reflect at a reflection location of the transmitter fiber 510, and travel back in the transmitter fiber 510 toward the third port 520. The switch 515 receives the reflected test pulse at the third port 520, switches the reflected test pulse to the second port 535, and outputs the reflected test pulse for fault detection, which is described further below. The effective range of the fault detection depends on the configuration time of the switch 515 because the reflected test pulse may enter the switch 515 before the switch 515 is able to change modes. For example, a 1 ns configuration time may limit fault detection to a reflection location of greater than 10 centimeters (cm), because 1 ns is enough time for light to travel approximately 10 cm in the transmitter fiber 510, reflect off a defect in the transmitter fiber 510, and travel 10 cm back to the switch 515. If the light has a shorter distance to travel before reflecting, the switch will not yet be configured to route the reflected pulse to the PD 565 for detection. In the second monitor mode, the optical test pulses travel in the receiver fiber 512, reflect at a reflection location of the receiver fiber 512, and travel back in the receiver fiber 512 toward the fourth port 530. The switch 515 receives the reflected test pulse at the fourth port 530, switches the reflected test pulse to the second port 535, and outputs the reflected test pulse for fault detection, which is described further below.

Finally, in both the first monitor mode and the second monitor mode, the PD 565 receives the reflected optical test pulses and converts the reflected optical test pulses to the second electrical signals. The amplifier 570 receives the second electrical signals, amplifies the second electrical signals, and outputs the second amplified electrical signals 568 to the microcontroller 555. The microcontroller 555 receives the second amplified electrical signals 568, calculates the reflection location to determine whether the transmitter fiber 510 or the receiver fiber 512 is faulty, and generates fiber diagnosis signals 557 indicating whether the transmitter fiber 510 or the receiver fiber 512 is faulty. Specifically, for the transmitter fiber 510, the microcontroller 555 calculates the reflection location based on the velocity of light in the transmitter fiber 510 and the distance between the LD 545 and the first port 525, the first port 525 and the third port 520, the third port 520 and the second port 535, and the second port and the PD 565, which are known. For the receiver fiber 512, the microcontroller 555 calculates the reflection location based on the velocity of light in the receiver fiber 512 and the distance between the LD 545 and the first port 525, the first port 525 and the fourth port 530, the fourth port 530 and the second port 535, and the second port and the PD 565, which are known. For both the transmitter fiber 510 and the receiver fiber 512, the microcontroller 555 calculates the reflection location further based on the time it takes for the optical test pulses to travel from the LD 545, to the reflection location, and back to the PD 565. That time varies depending on the distance of the reflection location from the third port 515 for the transmitter fiber 510 or from the fourth port 530 for the receiver fiber 512. When the reflection location is at the end of the transmitter fiber 510 or the receiver fiber 512, the fiber diagnosis signals 557 indicate that the transmitter fiber 510 or the receiver fiber 512 is not faulty. Otherwise, the fiber diagnosis signals 557 indicate the fiber being tested (either the transmitter fiber 510 or the receiver fiber 512) is faulty and where the transmitter fiber 510 or the receiver fiber 512 is faulty.

Figure 11:
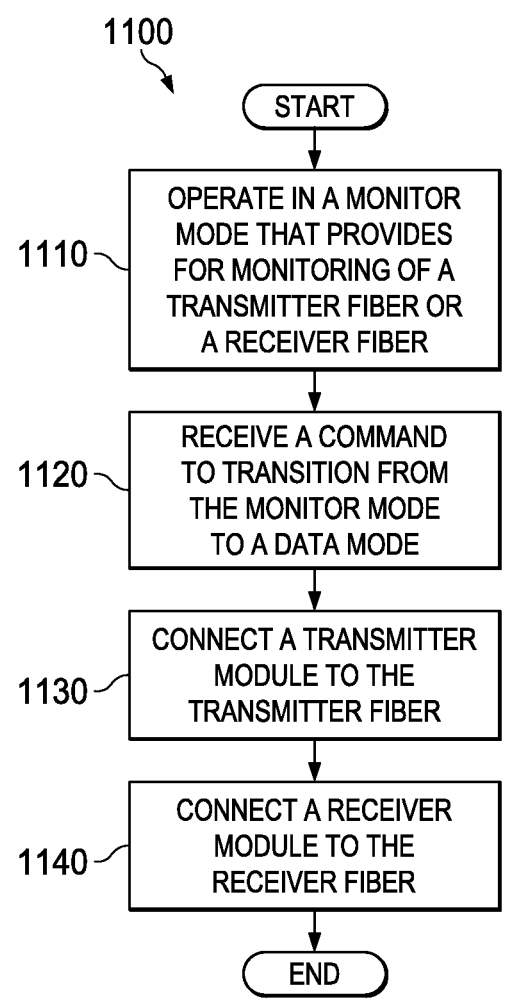
FIG. 11 is a flowchart illustrating a method of transitioning a switch from a monitor mode to a data mode.

FIG. 11 is a flowchart illustrating a method 1100 of transitioning a switch from a monitor mode to a data mode. The method 1100 may be performed in the switch. At step 1110, the switch operates in a monitor mode that provides for monitoring of a transmitter fiber or a receiver fiber. The transmitter fiber may be the transmitter fiber 510. The receiver fiber may be the receiver fiber 512. At step 1120, the switch receives a command to transition from the monitor mode to a data mode.

At step 1130, the switch connects a transmitter module to the transmitter fiber. For instance, the switch 515 connects the transmitter module 540 to the transmitter fiber 510. At step 1140, the switch connects a receiver module to the receiver fiber. For instance, the switch 515 connects the receiver module 560 to the receiver fiber 512. Step 1130, step 1140, or both may be omitted to provide only transmission or only reception. Both step 1130 and step 1140 may be performed at the same time in order to provide full duplex operation.

Figure 12:
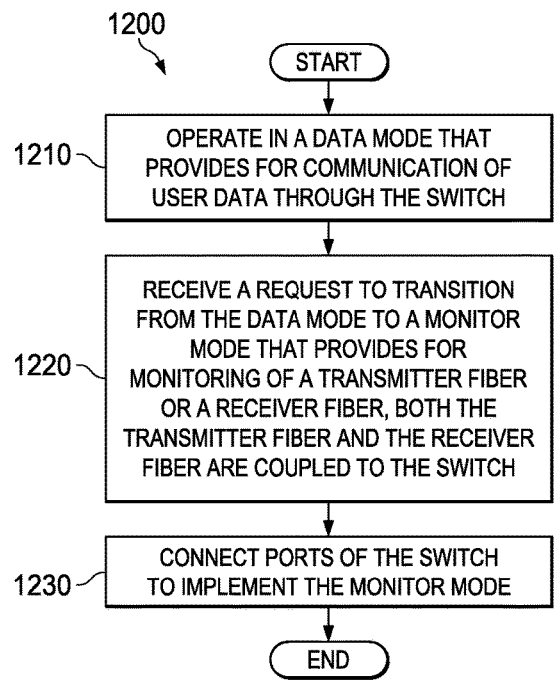
FIG. 12 is a flowchart illustrating a method of transitioning a switch from a data mode to a monitor mode.

FIG. 12 is a flowchart illustrating a method 1200 of transitioning a switch from a data mode to a monitor mode. The method 1200 may be performed in the switch 515. At step 1210, the switch operates in a data mode that provides for communication of user data through the switch. At step 1220, the switch receives a request to transition from the data mode to a monitor mode that provides for monitoring of a transmitter fiber or a receiver fiber. Both the transmitter fiber and the receiver fiber are coupled to the switch. The transmitter fiber may be the transmitter fiber 510. The receiver fiber may be the receiver fiber 512. At step 1230, the switch connects ports of the switch to implement the monitor mode.

Compared to the optical device 300, the optical device 500 has the following advantages. Firstly, the optical device 500 is compatible with standard LC connection pairs and applicable to all small form-factor pluggables (SFPs), QSFPs, and QSFP+. Secondly, the optical device 500 may expand the number of fibers and is suitable for future SFPs which include a plurality of transmitter modules 540 and receiver modules 560. Thirdly, the optical device 500 has lower cost because the optical device 500 does not include the OTDR circuit 330 and the mode switch 320, which are required in the optical device 300, and because the integration of the switch 515 in silicon has negligible cost. Fourthly, the optical device 500 may incorporate a switch which is capable of connecting with a large number of optical fibers, and efficiently monitor the large number of optical fibers. Fifthly, the optical device 500 has wide appeal, particularly for data centers. Sixthly, the optical device 500 has low insertion loss (for example, about 0.5 decibel (dB) of insertion loss).

Figure 13:
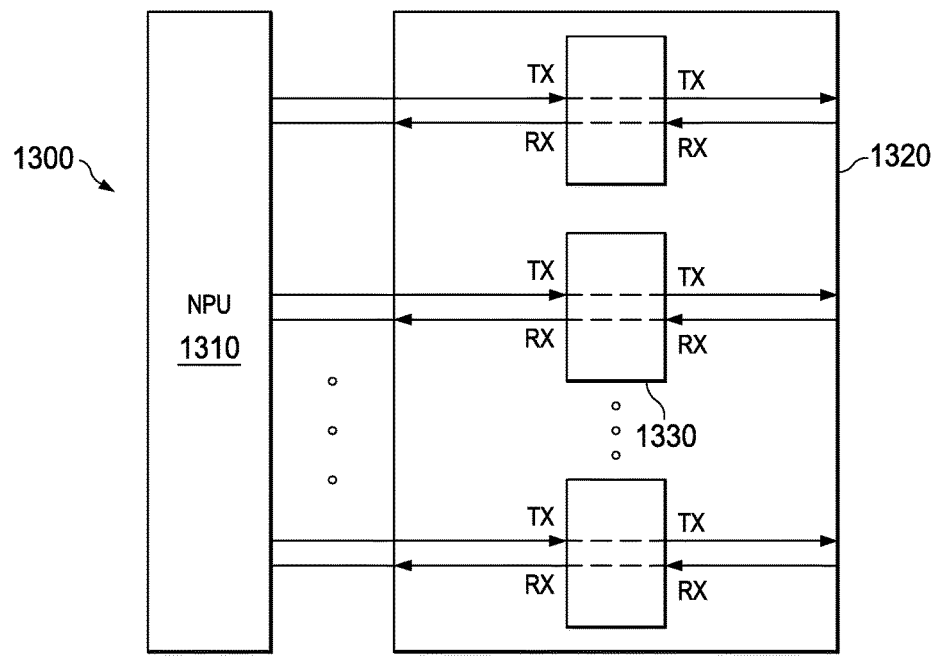
FIG. 13 is a schematic diagram of a transceiver system in a data mode.
Figure 14:
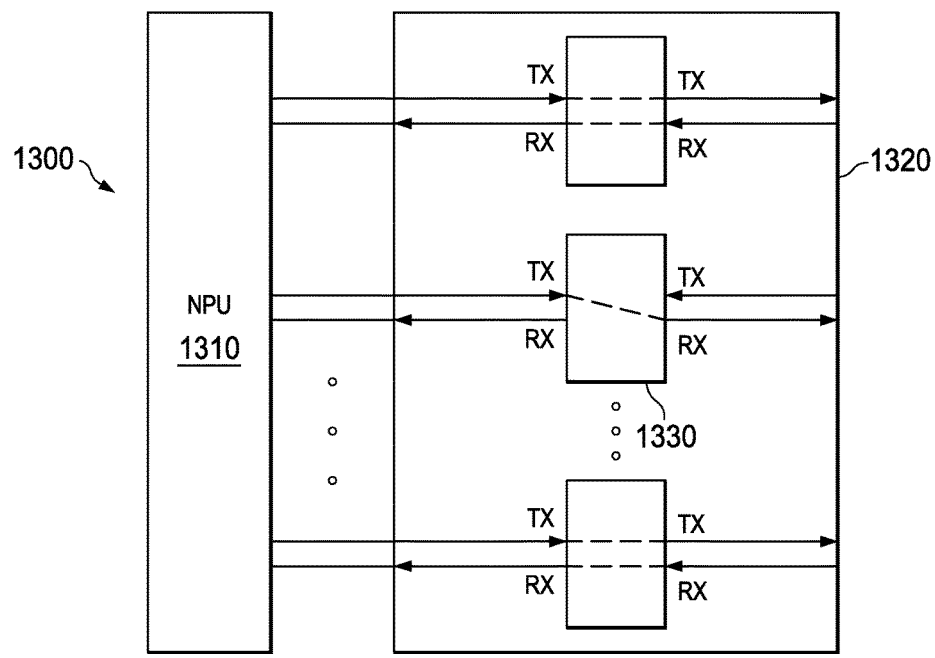
FIG. 14 is a schematic diagram of the transceiver system in FIG. 13 in a monitor mode.

Switches such as the switches 515 may be integrated in other applications. FIGS. 13-14 show different configurations for such applications. In FIG. 13 and FIG. 14, the switches may be configured to transition between a data mode and monitor modes.

FIG. 13 is a schematic diagram of a transceiver system 1300 in a data mode. The transceiver system 1300 includes an NPU 1310 and a chip 1320. The NPU 1310 is configured to receive and transmit optical signals, convert the optical signals to and from electrical signals, and process those electrical signals. The chip 1320 includes a plurality of switches 1330, which may be the same as the switch 515. The switches 1330 include transmitter (Tx) ports and receiver (Rx) ports. The switches 1330 are in a data mode because the transmitter ports and the receiver ports are coupled to each other as shown.

FIG. 14 is a schematic diagram of the transceiver system 1300 in FIG. 13 in a monitor mode. The top and bottom switches 1330 are in the data mode, but the middle switch 1130 is in a monitor mode because a transmitter port is coupled to a receiver port as shown. All the switches 1330 are independent of each other and may dynamically switch between a data mode and monitor modes. By switching among the modes, the switches 1330 may communicate with and monitor the NPU 1310 and media coupled to the transceiver system 1300.

Figure 15:
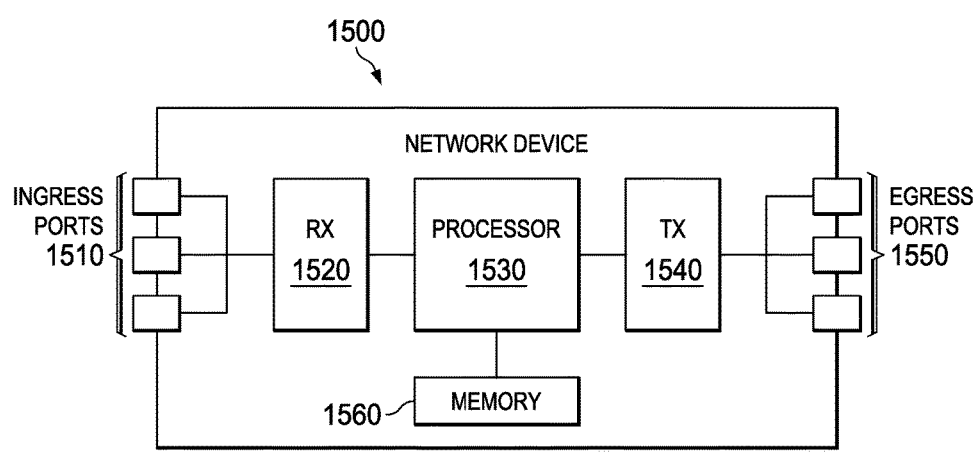
FIG. 15 is a schematic diagram of a network device.

FIG. 15 is a schematic diagram of a network device 1500. The network device 1500 is suitable for implementing the disclosed embodiments, including the microcontroller 360 and the microcontroller 555. The network device 1500 includes ingress ports 1510 and receiver units (Rx) 1520 for receiving data; a processor, logic unit, or central processing unit (CPU) 1530 to process the data; transmitter units (Tx) 1540 and egress ports 1550 for transmitting the data; and a memory 1560 for storing the data. The network device 1500 may also include optical-to-electrical (OE) components and electrical-to-optical (EO) components coupled to the ingress ports 1510, receiver units 1520, transmitter units 1540, and egress ports 1550 for egress or ingress of optical or electrical signals.

The processor 1530 may be implemented by hardware and software. The processor 1530 may be implemented as one or more CPU chips, cores (for example, as a multi-core processor), field-programmable gate arrays (FPGAs), application specific integrated circuits (ASICs), and digital signal processors (DSPs). The processor 1530 is in communication with the ingress ports 1510, receiver units 1520, transmitter units 1540, egress ports 1550, and memory 1560.

The memory 1560 includes one or more disks, tape drives, and solid-state drives and may be used as an overflow data storage device, to store programs when such programs are selected for execution, and to store instructions and data that are read during program execution. The memory 1560 may be volatile and non-volatile and may be read-only memory (ROM), random-access memory (RAM), ternary content-addressable memory (TCAM), and static random-access memory (SRAM).

Figure 16:
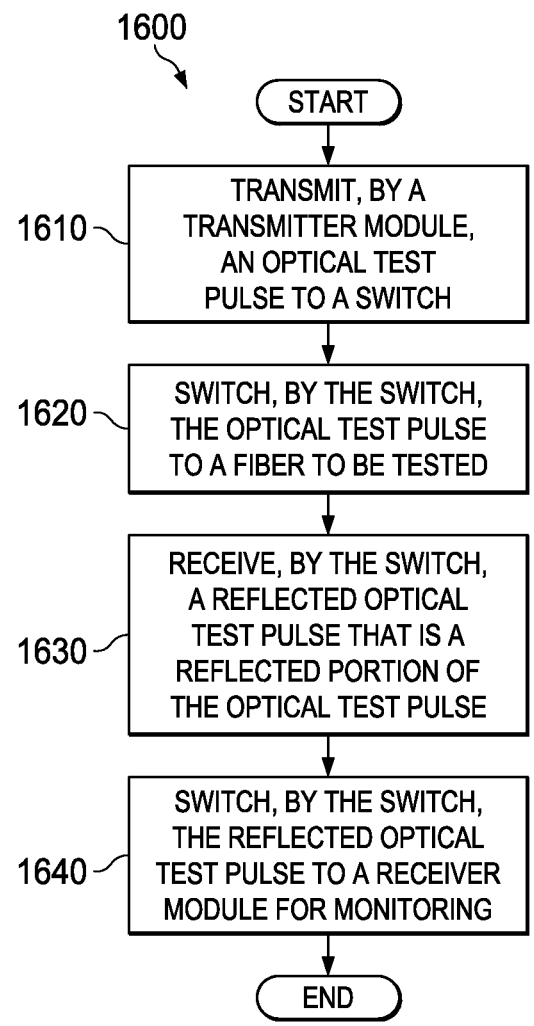
FIG. 16 is a flowchart illustrating a method of monitoring an optical test pulse.

FIG. 16 is a flowchart illustrating a method 1600 of monitoring an optical test pulse. The method 1600 may be implemented in the switch 515. At step 1610, an optical test pulse is transmitted by a transmitter module to a switch. For instance, the transmitter module 540 transmits an optical test pulse to the switch 515. At step 1620, the optical test pulse is switched by a switch to a fiber to be tested. For instance, the switch 515 switches the optical test pulse to either the transmitter fiber 510 or the receiver fiber 512.

At step 1630, a reflected optical test pulse is received by the switch. The reflected optical test pulse is a reflected portion of the optical test pulse. For instance, the switch 515 receives the reflected optical test pulse. At step 1640, the reflected optical test pulse is switched by a switch to a receiver module for monitoring. For instance, the switch 515 switches the reflected optical test pulse to the receive module 560 for monitoring.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical device comprising:
   a transmitter module configured to:
     transmit optical data signals in a data mode; and
     transmit an optical test pulse in a monitor mode;
   a receiver module configured to:
     receive input optical data signals in the data mode; and
     receive a reflected optical test pulse in the monitor mode; and
   a switch coupled to the transmitter module and the receiver module and configured to:
     switch optical paths to implement the data mode or the monitor mode; and
     in the monitor mode, receive the optical test pulse from the transmitter module, couple the optical test pulse to a transmitter fiber, receive the reflected optical test pulse from the transmitter fiber, and couple the reflected optical test pulse to the receiver module.

2. The optical device of claim 1, wherein, in the data mode, the switch is configured to:
   receive the optical data signals from the transmitter module;
   couple the optical data signals to the transmitter fiber;
   receive the input optical data signals from a receiver fiber; and
   couple the input optical data signals to the receiver module.

3. The optical device of claim 1, wherein, in the monitor mode, the switch is configured to:
   receive the optical test pulse from the transmitter module;
   couple the optical test pulse to a receiver fiber;
   receive the reflected optical test pulse from the receiver fiber; and
   couple the reflected optical test pulse to the receiver module.

4. The optical device of claim 1, wherein the reflected optical test pulse is a reflected portion of the optical test pulse.

5. The optical device of claim 1, wherein the receiver module comprises:
   a photodiode (PD) coupled to the switch and configured to:
     receive the input optical data signals in the data mode;
     receive the reflected optical test pulse in the monitor mode; and
     output electrical signals; and
   an amplifier coupled to the PD and configured to:
     receive the electrical signals;
     amplify the electrical signals; and
     output amplified electrical signals.

6. The optical device of claim 5, further comprising a microcontroller coupled to the amplifier and configured to:
   receive the amplified electrical signals; and
   determine a fault location of either a transmitter fiber or a receiver fiber.

7. The optical device of claim 1, further comprising a controller coupled to the transmitter module and the receiver module and configured to determine a travel time of the optical test pulse.

8. An optical device comprising:
a transmitter module configured to:
transmit optical data signals in a data mode; and
transmit an optical test pulse in a monitor mode;
a receiver module configured to:
receive input optical data signals in the data mode; and
receive a reflected optical test pulse in the monitor mode; and
a switch coupled to the transmitter module and the receiver module and configured to:
switch optical paths to implement the data mode or the monitor mode; and
in the monitor mode, receive the optical test pulse from the transmitter module, couple the optical test pulse to a receiver fiber, receive the reflected optical test pulse from the receiver fiber, and couple the reflected optical test pulse to the receiver module.

9. The optical device of claim 8, wherein, in the data mode, the switch is configured to:
receive the optical data signals from the transmitter module;
couple the optical data signals to a transmitter fiber;
receive the input optical data signals from the receiver fiber; and
couple the input optical data signals to the receiver module.

10. The optical device of claim 8, further comprising a controller coupled to the transmitter module and the receiver module and configured to determine a travel time of the optical test pulse.

11. An optical device comprising:
a transmitter module configured to:
transmit optical data signals in a data mode; and
transmit an optical test pulse in a monitor mode;
a switch coupled to the transmitter module and configured to switch optical paths to implement the data mode or the monitor mode;
a receiver module configured to:
receive input optical data signals in the data mode, and
receive a reflected optical test pulse in the monitor mode; and
a microcontroller coupled to the transmitter module and the receiver module and configured to determine a travel time of the optical test pulse.

12. The optical device of claim 11, wherein the microcontroller is further configured to determine a fault location of either a transmitter fiber or a receiver fiber based on the travel time.

13. A method implemented in an optical device, the method comprising:
transmitting, by a transmitter module, optical data signals in a data mode;
transmitting, by the transmitter module, an optical test pulse in a monitor mode;
receiving, by a receiver module, input optical data signals in the data mode;
receiving, by the receiver module, a reflected optical test pulse in the monitor mode;
switching, by a switch coupled to the transmitter module and the receiver module, optical paths to implement the data mode or the monitor mode; and
when in the monitor mode, receiving the optical test pulse from the transmitter module, coupling the optical test pulse to an optical fiber, receiving the reflected optical test pulse from the optical fiber, and coupling the reflected optical test pulse to the receiver module.

14. The method of claim 13, wherein the optical fiber comprises a transmitter fiber for propagating the optical data signals in the data mode.

15. The method of claim 13, wherein the optical fiber comprises a receiver fiber for propagating the input optical data signals in the data mode.

16. The method of claim 13, further comprising determining, by a controller, a travel time of the optical test pulse in the optical fiber.

17. The method of claim 16, further comprising determining, by the controller and based on the travel time, a fault location along a length of the optical fiber.

* * * * *